US008942689B2

(12) United States Patent
Steenstra et al.

(10) Patent No.: US 8,942,689 B2
(45) Date of Patent: Jan. 27, 2015

(54) METHOD AND TECHNOLOGY FOR REMOTE ADMINISTRATION OF WIRELESS DEVICES

(75) Inventors: Jack Steenstra, San Diego, CA (US); Kirk Taylor, San Diego, CA (US); Liren Chen, San Diego, CA (US); Paul Hedtke, San Diego, CA (US); Richard J. Lobovsky, Brooklyn, NY (US)

(73) Assignee: QUALCOMM Incorporated, San Diego, CA (US)

( * ) Notice: Subject to any disclaimer, the term of this patent is extended or adjusted under 35 U.S.C. 154(b) by 1950 days.

(21) Appl. No.: 11/682,475

(22) Filed: Mar. 6, 2007

(65) Prior Publication Data
US 2008/0218309 A1 Sep. 11, 2008

(51) Int. Cl.
H04M 3/00 (2006.01)
H04W 8/24 (2009.01)

(52) U.S. Cl.
CPC .................................. H04W 8/245 (2013.01)
USPC ........................... 455/418; 455/417; 455/419

(58) Field of Classification Search
CPC ............................... H04W 8/245; H04M 3/00
USPC ................. 455/418, 419, 420, 423; 709/224; 705/7.11; 713/191, 186, 182; 370/331
See application file for complete search history.

(56) References Cited

U.S. PATENT DOCUMENTS

| | | | |
|---|---|---|---|
| 5,699,275 A | 12/1997 | Beasley et al. | |
| 6,351,639 B1 | 2/2002 | Motohashi | |
| 6,473,794 B1 * | 10/2002 | Guheen et al. | 709/223 |
| 6,914,891 B2 | 7/2005 | Ha et al. | |
| 7,321,814 B2 * | 1/2008 | Kanda et al. | 701/29.6 |
| 7,773,982 B2 * | 8/2010 | Bishop et al. | 455/420 |
| 7,793,109 B2 * | 9/2010 | Ortiz | 713/186 |
| 7,921,297 B2 * | 4/2011 | Ortiz et al. | 713/182 |
| 2001/0046854 A1 | 11/2001 | Henry et al. | |
| 2002/0123335 A1 | 9/2002 | Luna et al. | |
| 2003/0143946 A1 * | 7/2003 | Grzeczkowski | 455/3.05 |
| 2004/0032880 A1 | 2/2004 | Leung et al. | |
| 2004/0098715 A1 | 5/2004 | Aghera et al. | |
| 2004/0203755 A1 | 10/2004 | Brunet et al. | |
| 2004/0215702 A1 | 10/2004 | Hamasaki, Jr. et al. | |
| 2004/0240644 A1 | 12/2004 | Stiegel et al. | |
| 2005/0010310 A1 | 1/2005 | Touzov | |

(Continued)

FOREIGN PATENT DOCUMENTS

| | | |
|---|---|---|
| JP | 2001359157 A | 12/2001 |
| JP | 2005198099 A | 7/2005 |

(Continued)

OTHER PUBLICATIONS

International Search Report, PCT/US2008/056092, International Searching Authority, European Patent Office, Nov. 24, 2008.

(Continued)

*Primary Examiner* — Jinsong Hu
*Assistant Examiner* — Jean Chang
(74) *Attorney, Agent, or Firm* — Satheesh K. Karra

(57) ABSTRACT

A remote administrator to allow a caregiver to configure a user's wireless device includes a master software client in the remote administrator and a controllable software client in the wireless device. Commands transmitted to the wireless device from the remote administrator allow the caregiver to configure the user's wireless device based on user initiated configuration requested.

48 Claims, 12 Drawing Sheets

(56) References Cited

U.S. PATENT DOCUMENTS

| | | |
|---|---|---|
| 2005/0079863 A1 | 4/2005 | Macaluso |
| 2005/0114504 A1* | 5/2005 | Marolia et al. ................ 709/224 |
| 2005/0149368 A1* | 7/2005 | Brunet et al. ..................... 705/7 |
| 2005/0164691 A1 | 7/2005 | Payne |
| 2005/0172141 A1* | 8/2005 | Gayde et al. .................. 713/191 |
| 2005/0259618 A1* | 11/2005 | Ahya et al. .................... 370/331 |
| 2005/0272451 A1 | 12/2005 | Ho et al. |
| 2006/0003758 A1* | 1/2006 | Bishop et al. ................ 455/419 |
| 2006/0099977 A1 | 5/2006 | Lai et al. |
| 2008/0162950 A1* | 7/2008 | Brown et al. ................ 713/300 |

FOREIGN PATENT DOCUMENTS

| | | |
|---|---|---|
| WO | 9716938 | 5/1997 |
| WO | 9838820 | 9/1998 |
| WO | 0064202 | 10/2000 |
| WO | 2004059963 | 7/2004 |
| WO | 2004062248 A1 | 7/2004 |

OTHER PUBLICATIONS

Written Opinion, PCT/US2008/056092. International Searching Authority, European Patent Office, Nov. 24, 2008.

\* cited by examiner

METHOD AND TECHNOLOGY FOR REMOTE ADMINISTRATION OF WIRELESS DEVICES

CLAIM OF PRIORITY UNDER 35 U.S.C. §119

None.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to administration and configuration of wireless devices, and more specifically to allowing authorized third party individuals or services to remotely administrate cellular telephones.

2. Background

Wireless data communication devices ("wireless devices") are used in an ever increasing number of activities today. The wireless devices include, for example, handheld computers, PDAs, pagers, cellular telephones, digital music players, etc. Increasingly, the wireless devices are call upon to perform more and more, functions, including access and storage to secure personal information, such as, for example, financial information, electronic mail, or the like.

However, as the wireless devices become increasingly more complex to perform the wide variety of functions that many users demand, the keystrokes, voice commands, graphical user interfaces, and menu options become increasingly difficult to master and apply. Moreover, the complex commands required frequently are reduced to cryptic phrases or keystrokes that the average person may not comprehend. Once initially programmed, reprogramming or altering the initial settings can frequently be equally or more challenging to many user.

Some people that are either unable to perform the complex command functions, such as, for example, a person with arthritis may not be capable of manipulating the keys, or simply unwilling to perform the complex commands, such as, for example, a person that is not literate with the technology or uncomfortable using the technology. This combined with the often less than user-friendly interface of, for example, the common cellular telephone, means many people do not use the wireless devices to the full extent despite the benefits of some of those uses. Increasingly, the ability to perform certain routine tasks is becoming difficult without the use of technology. For example, USAA operates a virtual bank in which a member's ability to use its services is greatly enhanced if they are familiar or comfortable with technology. Thus, it would be beneficial to have a cellular telephone or other wireless device in which a remote patty or administrator can access, modify, or activate the functionality of the wireless device for a particular user without requiring any difficult or complex operations by the wireless device's user.

SUMMARY

Embodiments disclosed herein address the above stated needs by providing for remote access of a wireless device by an authorized administrator. The authorized administrator may be a care giver, service provided or the like. The authorized administrator can access and control the functionality of the wireless device to provide assistance in enabling, altering, disabling, or the like, various wireless device functionalities.

In one aspect, a method for remotely configuring a wireless device of a user by a service provider is provided. The configuration is accomplished by communicating a requested configuration from the user of the wireless device to the service provider. The service provider accesses a remotely located administration device to initiate a configuration change based on the requested configuration. The remotely located device transmits commands to execute the configuration change that are received at the wireless device. The wireless device confirms the commands are from an authorized source and executes the commands to implement the requested configuration, wherein the caregiver can remotely cause configuration changes.

In another aspect, a method of remotely trouble shooting wireless device and configuring the wireless device based on the results is provided. The user of the wireless device communicates a need to trouble shoot the wireless device to the service provider. The service provider accesses a remotely located administration device to initiate the trouble shooting and transmits an identification and authorization to trouble shoot identification to the wireless device. The trouble shooting procedure is initiated and the results are returned to the remotely located device and displayed to the service provider, who may initiate a configuration change based on the results.

In still another aspect, a method for remotely checking the configuration of a wireless device of a user by a service provider is provided. A service provider accesses administrative functions on a remote device and transmits a configuration check request to the wireless device. The wireless device may authentic the request and retrieves the actual configuration of the device and returns the information, which is displayed to the requester.

In yet another aspect, a method of alerting a remote administrator that an alarm condition exists on a wireless device is provided. The wireless device is pre-configured to settings that have minimum settings stored in a memory or database. The actual device settings are polled from time to time and compared to the stored settings. Based on the comparison, if an alarm condition is indicated, the alarm condition is transmitted to the service provider.

In still another aspect, a wireless system to allow a remote administrator to configure the wireless device is provided. The system includes a communication network interconnected to a base station. A wireless device is wirelessly interconnected to the base station and a remote administrator is interconnected to the communication network. The wireless device includes a controllable software client and the remote administrator includes a master software client. Wherein the remote administrator can transmit command functions from the master software client to the controllable software client, such that the command functions are executed by the controllable software client to configure the wireless device.

The foregoing and other features, utilities and advantages of the device and system will be apparent from the following more particular description of a preferred embodiment of the invention as illustrated in the accompanying drawings.

DETAILED DESCRIPTION

Figure 1:
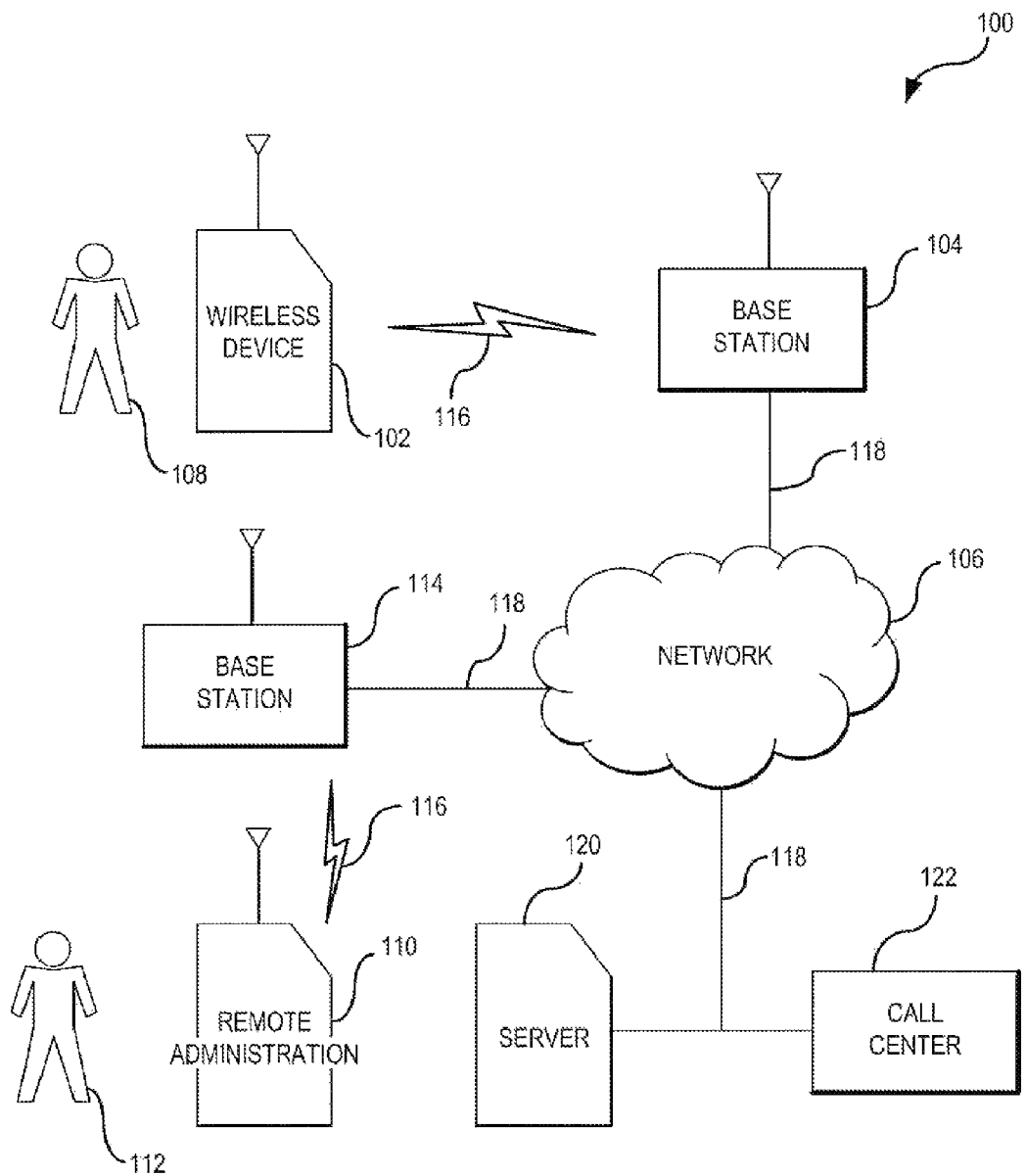
FIG. 1 is a block diagram illustration of a wireless communications system of an exemplary embodiment of the disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

The word "biometric identification" is used herein to mean identification of an individual from a measurement of one or more physical features or repeatable actions of the individual. Such physical features or repeatable actions may include, for example, hand geometry, retinal scan, iris scan, fingerprint patterns, facial characteristics, DNA sequence characteristics, voice prints, hand written signature, etc.

The word "network" is used herein to mean one or more conventional or proprietary networks using an appropriate network data transmission protocol. Examples of such networks includes, PSTN, LAN, WAN, WiFi, WiMax, Internet, World Wide Web, Ethernet, other wireless networks, and the like.

The word "configure" is used herein broadly to mean to include enabling particular functions, disabling functions, altering wireless device settings (such as volume, brightness, etc.), downloading applications, downloading data, downloading software patches, and the like.

FIG. 1 illustrates a wireless communications network 100 of an exemplary embodiment. In this embodiment, the wireless communications network 100 includes a wireless device 102, which is usable by an individual or user 108 including those not technology literate, unable, or unwilling to otherwise access one or more wireless device feature, and a base station 104 that is interconnected to a network 106, which may be a single network or a combination of different networks, such as, for example, the public switched telephone network (PSTN) or the Internet, to name but two possible networks. Also included in this embodiment is a remote administrator 110, which is usable by, for example, a caregiver 112 of individual 108. Remote administrator 110 is shown as a wireless device connected network 106 through a base station 114. However, remote administrator 110 may be connected to network 106 by a direct connection, such as a network server, personal computer or processor, or the like. Remote administrator 110 and Wireless device 102 may be identical units. Server 120 and call center 122 also are interconnected to network 106. The wireless device 102, in this embodiment, may be any number of wireless devices, such as, for example, a mobile telephone, that communicates, with base station 104 using one or more of many available wireless protocols such as CDMA, GSM, WiFi, or the like. While the wireless device 102 as discussed in many of the embodiments herein is described as a mobile, cellular, or cell telephone, it will be understood that other devices may also serve as a the wireless device, such as a personal computer, PDA, digital music player, electronic games, among others. Furthermore, while a single wireless device 102 is illustrated in FIG. 1, it will be understood that a typical wireless communications network 100 will include many remote wireless devices 102 and that a single wireless device 102 is illustrated for purposes of a simplified illustration and discussion. Similarly, remote administrator 110 as discussed in many of the embodiments herein is described as a mobile, cellular, or cell telephone, it will be understood that other devices may also serve as a remote station as well. Furthermore, while a single remote administrator 110 is illustrated in FIG. 1, it will be understood that a typical wireless communications network 100 may include numerous remote administrator devices 110 and that a single remote administrator device 110 is illustrated for purposes of a simplified illustration and discussion. Also, remote administrator 110 may administrate a single wireless device 102, as will be discussed, but also may administrate multiple wireless devices 102, some of which may be connected through separate coverage areas.

The wireless device 102 of the embodiment of FIG. 1 communicates with base station 104 over a wireless communication link 116. Such communication link may include any available communications protocol, such as CDMA, although any other analog and/or digital communications protocol may also be used. The base station 104 is interconnected with network 106 through a wired communication link 118, and communicates with one or more other devices also interconnected with the network 106, such as a server 120 or a call center 122. While shown as a wired communication link 118, wired communication link 118 may be a wireless or wired link using any conventional protocol. Moreover, the various communication links 116, 118 may be diverse protocols. While a single base station 104 is illustrated, it will be understood that wireless communications networks 100 typically include many base stations throughout the coverage area of the wireless communications network 100. Server 120, in this embodiment, is interconnected with the network 106, and may provide services and/or information to the wireless device 102, such as, for example, configuration adjustments, as will be explained further below. Call center 122 also is interconnected to the wireless device 102 through network 106 in this embodiment, and may have operators or assistants that may provide services and/or information to the wireless device 102 or user 108 of wireless device 102 related to configuration adjustments. While this embodiment illustrates the server 120, call center 122, and base station 104, and remote administrator 110 as separate items on the network 106, it will be understood that the functions of one or more of these items may be incorporated or co-located with one or more other items. Furthermore, while this embodiment illustrates a wireless communications network, the principles described also apply to traditional wired communications networks.

Figure 2:
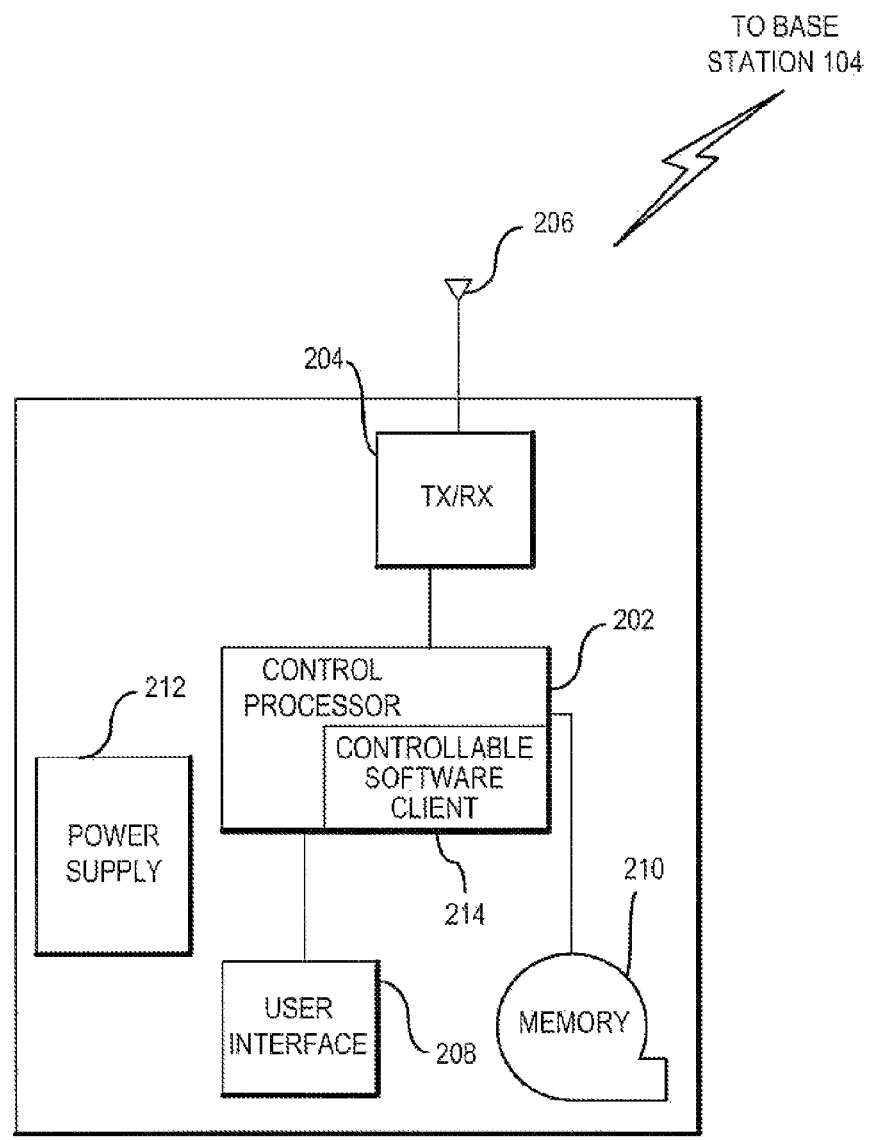
FIG. 2 is a block diagram illustration of a wireless device of an exemplary embodiment.

With reference now to FIG. 2, a wireless device 102 of an exemplary embodiment is described in more detail. The wireless device 102 includes several components, including a control processor 202. The control processor 202 controls functions of the wireless device 102, and provides computing functionality to process many inputs and/or data as may be required for the operation of the wireless device. For example control processor 202 includes routines, modules or circuits to add, delete, or edit entries to contact list; add, delete, assign, or edit speed dial assignments adjust display settings such as contrast and brightness, adjust volumes, adjust ring styles and volumes, accessing hands free access, location services, downloading application programs, storage and memory maintenance, and the like. Connected to the control processor 202 is transmit/receive circuitry 204 that transmits/receives wireless signals to/from an antenna 206. While shown as a single circuit, transmit and receive circuitry 204 may be separate circuits. The transmit/receive circuitry 204 performs functions typical of such components as used in wireless communications, such as modulating signals received from the control process 202 to be transmitted over the antenna 206, and demodulating signals received from the antenna 206 and providing the demodulated signals to the control processor 202. The antenna 206 may be any antenna suitable for wireless communications in the wireless communications network 100, and while illustrated as a single antenna, may include one or more different send and receive antennas. A user interface 208 is interconnected with the control processor 202, and provides an audio, visual, and/or physical interface to a user. Such user interfaces 208 commonly include a speaker, microphone, visual display screen, and one or more physical input devices such as a keypad, trackwheel, and/or special input buttons that control speaker/ringer volume, etc. The user interface 208 also may include a biometric identification input that collects biometric information for use in authenticating the identity of an individual. The control processor 202, in this embodiment, also is interconnected with a memory 210, that may be used to store processing instructions to be executed by the control processor 202 as well as information used by various functionalities of the wireless device, such as, for example, contact numbers, speed dial information, etc. The memory 202 also may store data necessary or convenient for the operation of the wireless device 102, such as data relating to one or more base stations, network timing information, and a directory of user contacts, to name but a few. Such memory 210 may include volatile and/or nonvolatile memory on any suitable storage media. The wireless device 102 also includes a power supply 212 that may include one or more rechargeable batteries and an interface to an external power source. Furthermore, while not illustrated in FIG. 2, many remote stations include additional components such as, for example, cable interfaces that allow the remote station to be interconnected with other computing devices, short range wireless transmitters/receivers such as BLUETOOTH technology devices, and/or CCD arrays for digital imaging.

Control processor 202 also contains a controllable software client 214 operating in or in conjunction with control processor 202. As will be explained in more detail below, controllable software client 214 can receive and execute command functions from remote administrator 110, for example. Controllable software client 214 may be configured using a number of software routines and modules to execute scripts or the like, but it is believed BREW™ (Binary Runtime Environment for Wireless), from Qualcomm Inc., provides an acceptable software environment. Using the commands from remote administrator 110, controllable software client 214 can cause control processor 202 to configure wireless device 102. Controllable software client 214 may have independent memory capability or use memory 202 to compile statistics and configuration information for wireless device 102. For example, if wireless device is currently configured to a volume setting of medium, high volume, controllable software client 214 has access to this information to allow remote administrator to poll or query the status of the device as will be explained further below.

Figure 3:
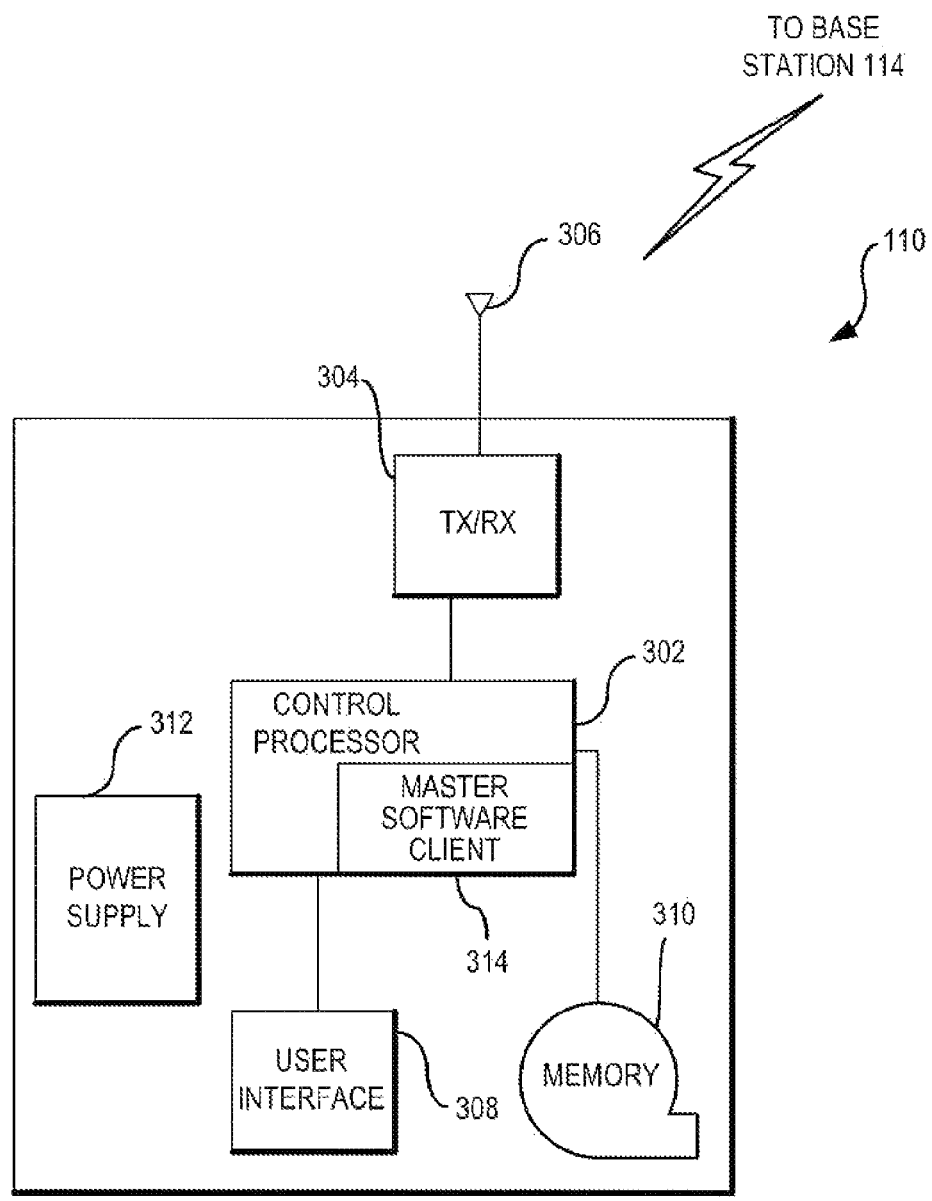
FIG. 3 is a block diagram illustration of a remote administrator of an exemplary embodiment.

FIG. 3 is a block diagram illustration of a remote administrator 110 of an exemplary embodiment. In this embodiment, the remote administrator 110 of an exemplary embodiment is described in more detail. The remote administrator 110 components, similar to wireless device 102, including a control processor 302. The control processor 302 controls functions of the remote administrator 110, and provides computing functionality to process many inputs and/or data as may be required for the operation of the remote administrator. For example, remote administrator 110 may be a cellular telephone and control processor 302 includes routines, modules or circuits to add, delete, or edit entries to contact lists; add, delete, assign, or edit speed dial assignments, adjust display settings such as contrast and brightness, adjust volumes, adjust ring styles and volumes, accessing hands free access, location services, downloading application programs, storage and memory maintenance, and the like. Alternatively, remote administrator may be an administration only tool and would only have functionality to perform the administration function. Connected to the control processor 302 is transmit/receive circuitry 304 that transmits/receives wireless signals to/from an antenna 306. The transmit/receive circuitry 304 performs functions typical of such components as used in wireless communications, such as modulating signals received from the control processor 302 to be transmitted over the antenna 306, and demodulating signals received from the antenna 306 and providing the demodulated signals to the control processor 302. The antenna 306 may be any antenna suitable for wireless communications in the wireless communications network 100, and while illustrated as a single antenna, may include one or more different send and receive antennas. A user interface 308 is interconnected with the control processor 302, and provides an audio, visual, and/or physical interface to a user. Such user interfaces 308 commonly include a speaker, microphone, visual display screen, and one or more physical input devices such as a keypad, trackwheel, and/or special input buttons that control speaker/ringer volume, etc. The user interface 308 also may include a biometric identification input that collects biometric information for use in authenticating the identity of an individual. The control processor 302, in this embodiment, also is interconnected with a memory 310, that may be used to store processing instructions to be executed by the control processor 302 as well as information used by various functionalities of the remote administrator. The memory 310 also may store data necessary or convenient for the operation of the remote administrator 110, such as data relating to one or more base stations, network timing information, and a directory of user contacts, to name but a few. Such memory 310 may include volatile and/or nonvolatile memory on any suitable storage media. The remote administrator 110 also includes a power supply 312 that may include one or more rechargeable batteries and an interface to an external power source. Furthermore, while not illustrated in FIG. 2, many remote stations include additional components such as, for example, cable interfaces that allow the remote station to be interconnected with other computing devices, short range wireless transmitters/receivers such as BLUETOOTH technology devices, and/or CCD arrays for digital imaging.

Control processor 302 also contains a master software client 314 operating in or in conjunction with control processor 302. As will be explained in more detail below, master software client 314 can transmit command functions to wireless device 102, for example. Master software client 314 may be configured using a number of software routines and modules to execute scripts or the like, but it is believed BREW™ (Binary Runtime Environment for Wireless), from Qualcomm Inc. provides an acceptable software environment. Using the commands from master software client 314 in remote administrator 110, controllable software client 214 in wireless device can cause control processor 202 to configure wireless device 102. Notice, control processor 302 and master software client 314 may be identical in some applications of the technology.

Figure 4:
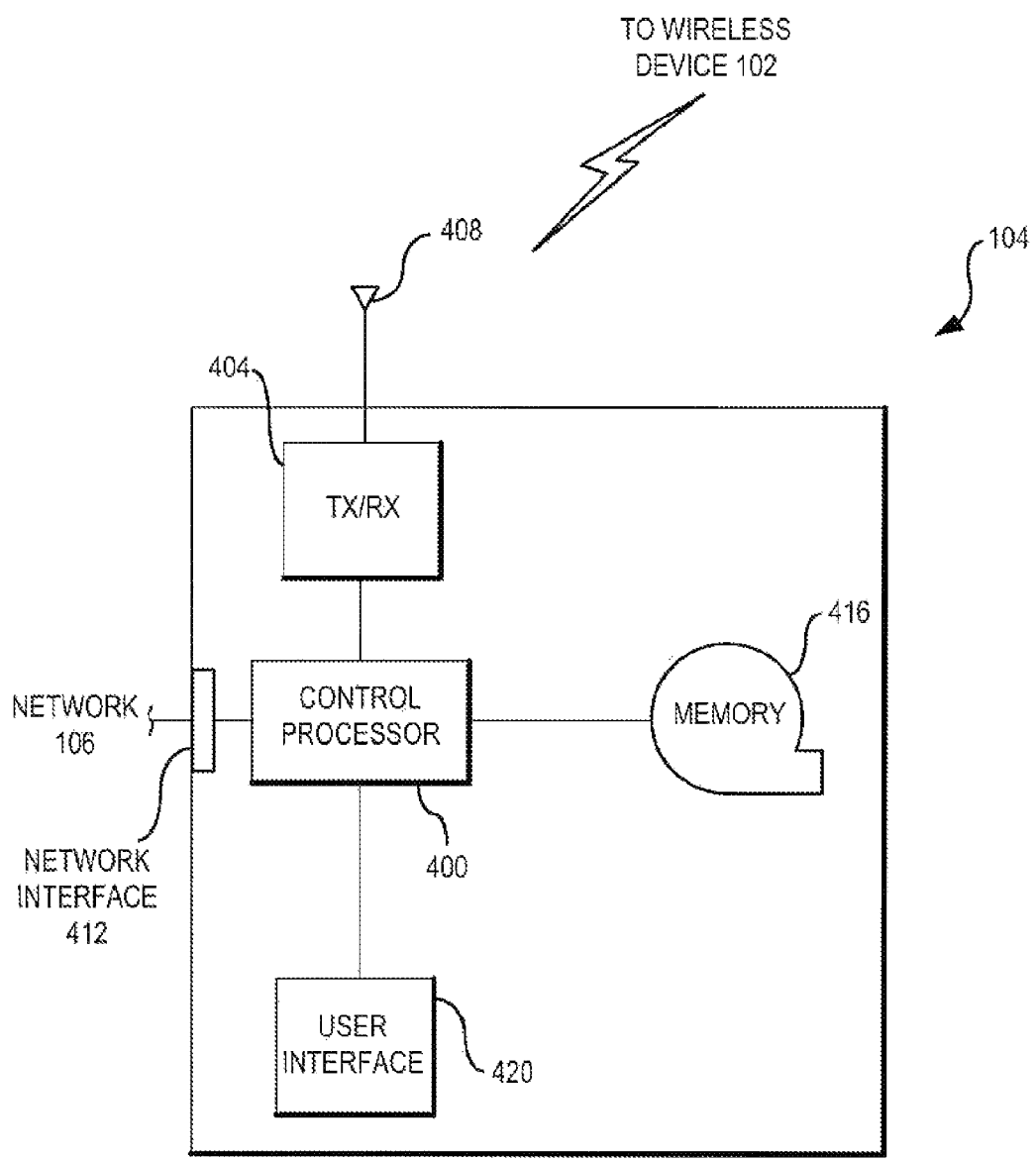
FIG. 4 is a block diagram illustration of a base station of an exemplary embodiment.

FIG. 4 is a block diagram illustration of base station 104 of an exemplary embodiment, a base station of an exemplary embodiment. In this embodiment, the base station 104 includes a control processor 400 that is interconnected to a transmit/receive subsystem 404 and antenna subsystem 408. The transmit/receive subsystem 404 provides capability to transmit/receive wireless communications to/from various different remote stations and/or other base stations. Furthermore, the transmit/receive subsystem 404 may provide communications with one or more satellites. The antenna subsystem 408 may include one or more different transmit and receive antennas, and may include different antennas for communications with different devices or with different communication protocols. A network interface 412 is interconnected to the control processor 400, and provides an interface to network 106 (FIG. 1). A memory 416 is interconnected to the control processor 400, and may store processing instructions to be executed by the control processor 400. The memory 416 also may store data necessary or convenient for the operation of the base station 104, such as data relating to one or more other base stations, data relating to one or snore remote stations within range of the base station 104, network timing information, and a directory of adjacent base stations, to name but a few. Such memory 416 may include volatile and/or nonvolatile memory on any suitable storage media. The base station 104 also includes a user interface 420, that may be used by network personnel to interface with the base station 104. Base station 104 may comprise an internal power source, but is typically powered by an external connection to the public utility power grid or a private generator (not specifically shown). Base station 114 is similar to base station 104 and will not be separately described herein for convenience.

Figure 5:
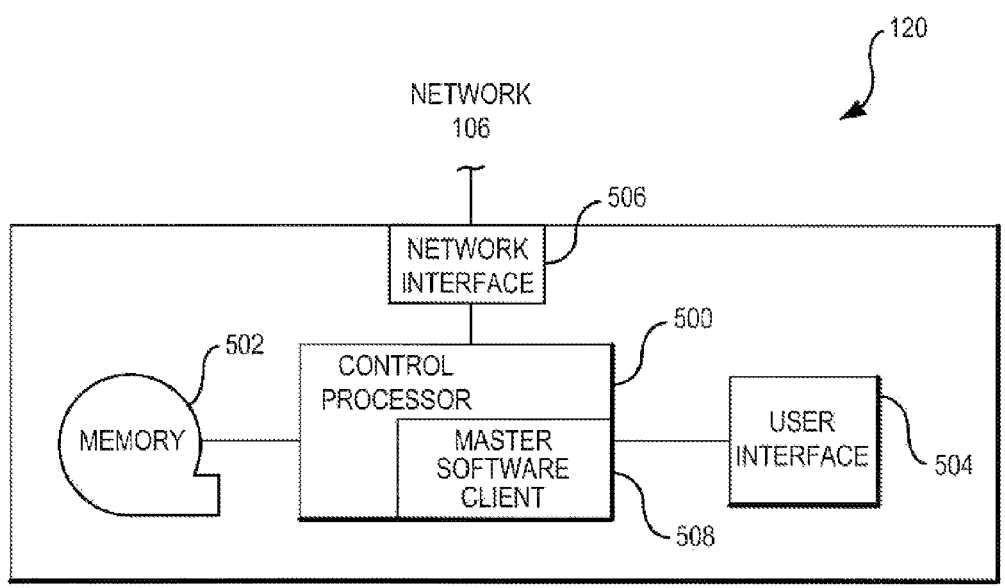
FIG. 5 is a block diagram illustration of a server of an exemplary embodiment.

FIG. 5 is a block diagram illustration of a server 120 an exemplary embodiment. In this embodiment, the server 120 includes a control processor 500 that is interconnected to a memory 502, user interface 504, and a network interface 506. The memory 502 is used to store processing instructions to be executed by the control processor 500. The memory 502 also may store data necessary or convenient for the operation of the server, such as data relating authorized individuals that may access personal information of various users and authentication information associated with the authorized individuals. In one embodiment, the server 120 is also associated with a database containing information related to individuals, access rights of the individuals, and authentication information for each of the individuals. Such memory 502 may include volatile and/or nonvolatile memory on any suitable storage media. The user interface 506 provides an interface for appropriate personnel to interface with the server 120. The network interface 506 provides an interface between the server 320 and the network 106 (FIG. 1). In one embodiment, personnel at the call center 122 (FIG. 1) access application programs of the server 120 and may use such applications to manage authentication and authorization information for individuals.

Server 120 also includes a second master software client 508. As will be explained in more detail below, second master software client 508 can transmit command functions to wireless device 102, for example, second master software client 508 may be configured using a number of software routines and modules to execute scripts or the like, but it is believed BREW™ (Binary Runtime Environment for Wireless), from Qualcomm Inc. provides an acceptable software environment. Using the commands from second master software client 508 in server 120, controllable software client 214 in wireless device can cause control processor 202 to configure wireless device 102. Notice, control processor 500 and second master software client 508 may be identical in some applications of the technology As discussed briefly above, various exemplary embodiments described herein provide a remote administrator that communicates with a wireless device to configure the wireless device on behalf of a user of the wireless device who otherwise is unable or unwilling to configure the device on his/her own. Although the below is described as commands being transmitted from remote administrator 110 directly to wireless device 102 over network 106, remote administrator 110 could relay commands to a networked server, such as server 120, that in turn relays commands to wireless device 102.

Figure 6:
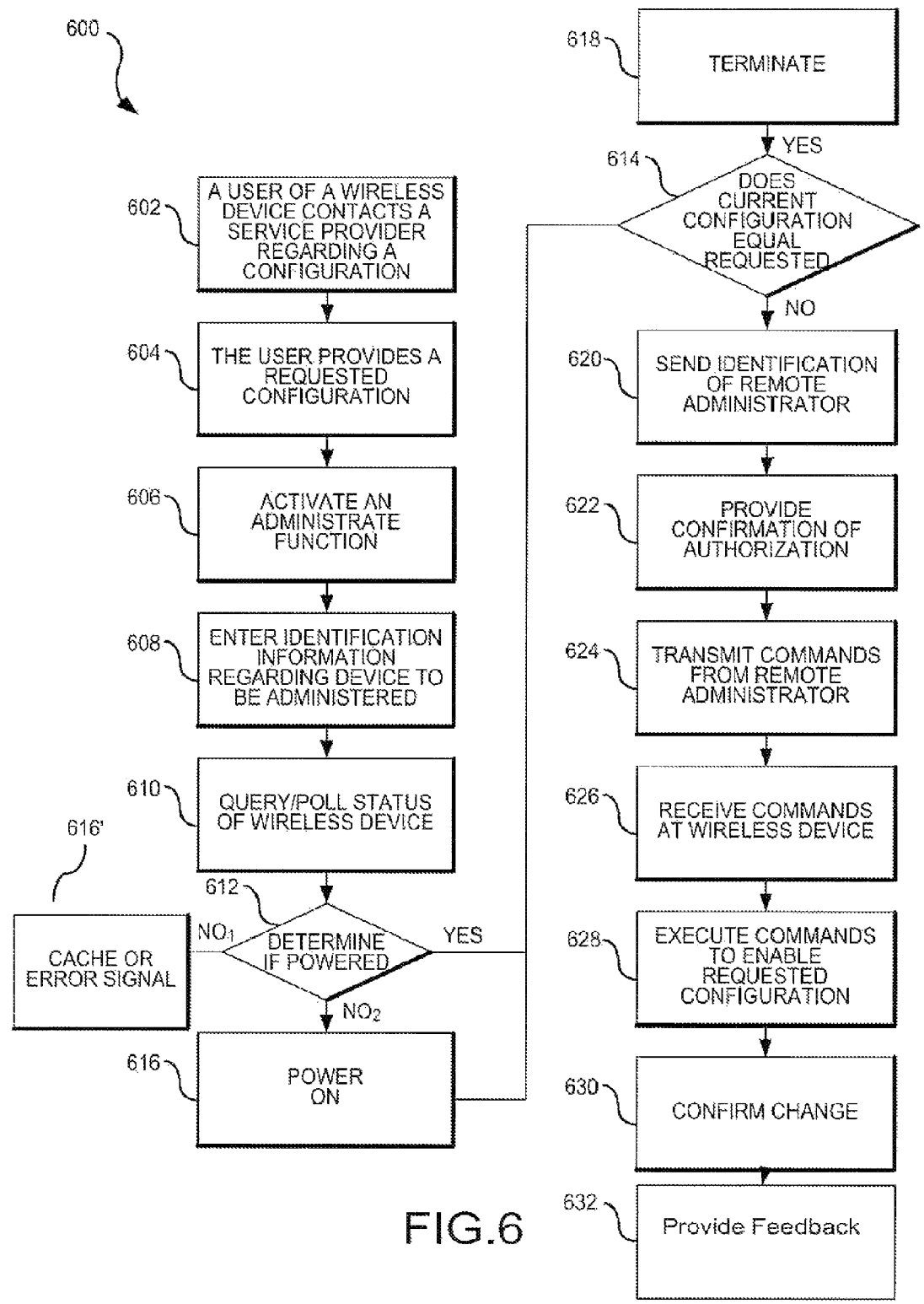
FIG. 6 is a flow chart diagram illustrating the operational steps for remotely configuring a wireless device of an exemplary embodiment.

Referring now to FIG. 6, an illustrative flow chart 600 of general configuration steps is provided for an exemplary embodiment. The process below could be initiated by the user 108 of wireless device 102 or the provider 112 at remote administrator 110, but the present exemplary process is described assuming user 108 initiates the configuration process. Moreover, while hot necessary, the configuration steps provided may be accomplished to provide real-time configuration changes for user 108. First, at step 602, user 108 contacts provider 112 regarding initiating a wireless device configuration operation. User 108 may contact provider 112 using wireless device 102, but may also contact provider 112 using alternative means, such as, for example, a conventional telephone, an email, speaking directly to the provider 112, accessing an web page, a combination thereof, or the like. If user 108 contacts provider 112 using wireless device 102, the contact may be by a traditional cellular telephone call between wireless device 102 and remote administrator 110, a traditional text message between wireless device 102 and remote administrator 110, a conventional peer-to-peer radio transmission between wireless device 102 and remote administrator 110, a combination thereof, or the like. Once the communication path is established, user 108 would communicate the configuration adjustment requested or needed, step 604. For purpose of this exemplary embodiment, it is assumed the user wishes to reconfigure a ring style from tones to vibrate because, for example, the user is about to enter a meeting. Provider 112 would activate, initiate, or access the remote administrator function on remote administrator 110, step 606. If necessary, remote administrator would enter an identifier to indicate which wireless device was to be administered, step 608. Optionally, remote administrator 110 would query the status of wireless device 102, step 610. Status queries could include, in this example, a determination query for whether wireless device is powered, step 612, a determination query for the current ring tone setting, step 614, or the like. Assuming the status query at step 612 indicates wireless device 102 is not powered, remote administrator 110 could send a power on Signal to power wireless device 102, step 616. Alternatively, the command functions could be stored in a cache to be applied the next time wireless device 102 is powered or an error signal could be provided, such as "device 102 is not on" (alternative step 616'). Such cache could be downloaded to wireless device 102 or, for example, server 120. If the query requests a current ring tone status (step 614), and the status indicates vibrate, the process may terminate as the requested configuration is already provided, step 618.

Optionally, remote administrator 110 may send an identification signal to wireless device 102, step 620. The identification could be a biometric signal from provider 112, a password, an electronic signature from the device, or the like. On reception of the identification signal, wireless device 102 may provide a authorization signal back to remote administrator 110 indicating it is authorized to administrate wireless device 102, step 622.

Next, the remote administrator 110 transmits commands over network 106 from master software client 314 to controllable software client 214, step 624. The commands may be direct commands, such as, for example,—set ring style to vibrate—or the commands may emulate the keystrokes that would be required to configure wireless device 102. In the emulation situation, provider 112 would access remote administrator 110 by activating, for example, a menu, selecting "ring style" or the like, and selecting "vibrate" or the like, which operations would occur on wireless device 102 substantially simultaneously if wireless device 102 is powered, but may be cached in, for example, server 120 if wireless device 102 is not powered. Alternatively, remote administrator could be capable of voice recognition and the commands could he activated by voice commands.

The transmitted commands are received by controllable software client 214, step 626. The controllable software client 214 executes the commands to configure wireless device 102 as commanded, step 628. Optionally, remote administrator may query or poll wireless device 102 to confirm the configuration change has occurred, or been accepted, step 630. Alternatively, wireless device 102 may transmit a confirmation of change or the like to remote administrator. While not necessary, the user 108 may provide feedback to remote administrator 110 regarding the changes, step 632. The feedback may include information regarding whether the change is satisfactory or unsatisfactory. Based on the feedback, further adjustments may be entered.

Figure 12:
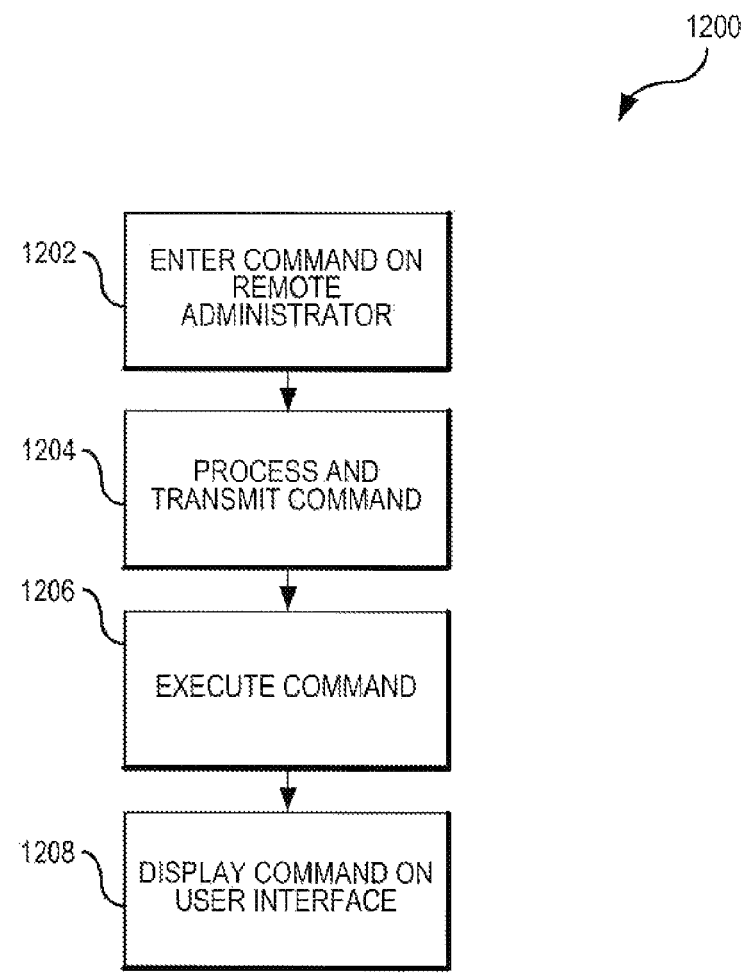
FIG. 12 is a flow chart diagram illustrating the operational steps for instruction.

In some cases, as described above, the user 108 of device 102 may elect to allow a service provider or care giver 112 to remotely administer device 102 because the user 108 is, for example, simply does not know how to perform the desired configuration. In this, and other, situations, the user 108 may be allowed to follow the commands as programmed or initiated by care giver 112. Referring to FIG. 12, an illustrative flowchart 1200 is provided of an instructional embodiment of the present invention. First, a remote administrator 110 enters a command on remote administrator device 112, step 1202. Master software client 314 processes the command and transmits the command to controllable software client 214, step 1204. Controllable software client 214 executes the command to reconfigure the device 102 based on the command, step 1206. Subsequent, and potentially substantially simultaneously, controllable software client 214 executes commands to cause user interface 208 to display keystrokes or commands entered by remote administrator 110, step 1208. For example, if the user 108 requests brightness of the interface 208 display be increased, remote administrator 110 may enter the following keystrokes: (1) press a "menu" button, (2) press arrow keys to highlight "display options", (3) press "OK" button when "display options" is highlighted, (4) press arrow keys to highlight "brightness", (5) press "OK" button when "brightness" is highlighted, (5) press arrow keys to increase or decrease brightness, and (6) press "OK" when desired brightness is provided. Using the tutorial or educational aspect, user interface 208 may display the keypad of device 102. When the remote administrator depresses the "menu" button, user interface 208 may highlight the "menu" button on the screen. The user interface 208 also may provide text or speech stating "depress menu bottom to begin requested configuration process" to provide both visual and textual/audio tutorial information. Alternatively to providing a graphical illustration on a display, particular keys may be highlighted on the keypad using backlighting or the like.

While the specific commands discussed above relate to ring style and brightness, remote administrator may be used to perform multiple configuration operations. Some exemplary configuration operations include making changes to contact lists, speed dial assignments, volume, display configurations (brightness, contrast, font size, etc.), speaker phone on or off, ring tone, downloading patches and applications operable on the wireless device, initiating communications with other devices (data exchanges or voice exchanges), starting an application (such as a navigation application), etc.

Figure 7:
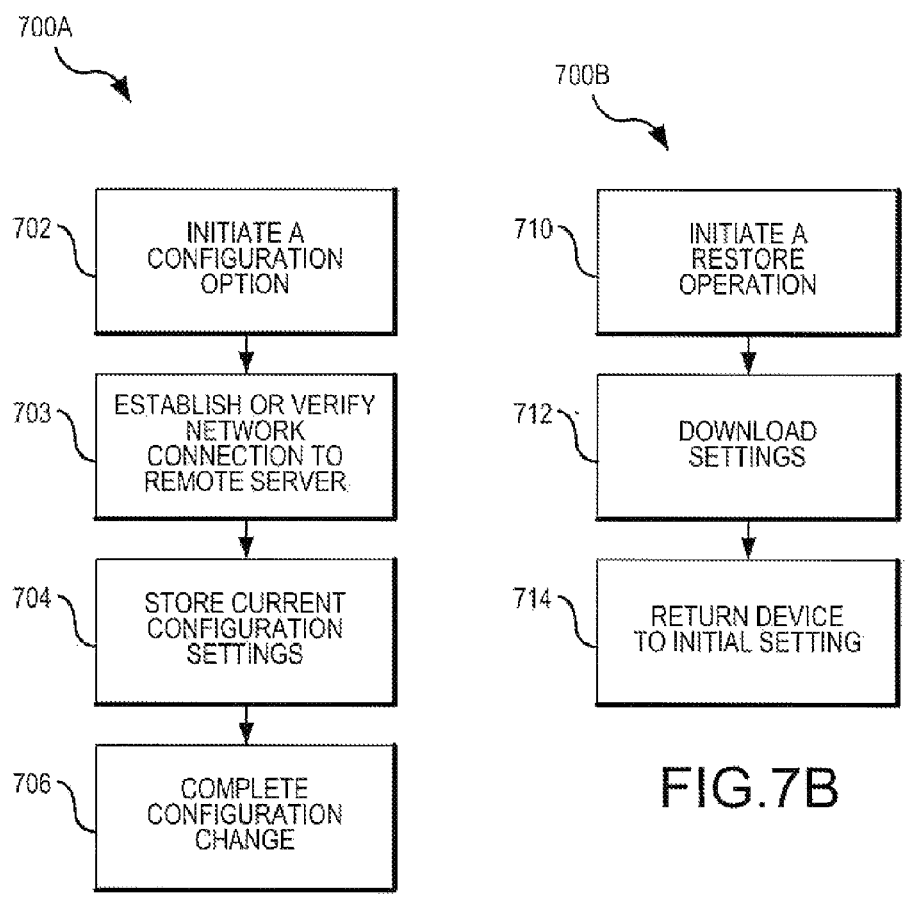
FIG. 7A is a flow chart diagram illustrating the operational steps for a storing current configuration of a wireless device of an exemplary embodiment.
FIG. 7B is a flow chart diagram illustrating the operational steps for restoring a wireless device to an initial setting of an exemplary embodiment.

In some cases, the provider 112 may misconfigure wireless device 102. Sometimes the misconfiguration can be corrected by simply resending configuration instructions and commands as outlined above. However, in some instances, numerous configuration changes may have been performed (in series, parallel, batch delivery, etc.) any one of which may have configured the telephone from an initial state to a less desirable state. Or, in some cases a single change may have been made that is difficult to return exactly to a previous setting, such as, for example, if display brightness is configured over a spectrum. Thus, user 108 may desire the wireless device to be restored to a previous configuration. FIGS. 7A and 7B are of flow charts 700A and 700B showing storing and reapplying saved settings to wireless device 102 to perform restoration functions of an exemplary embodiment. First, at step 702, a configuration operation is initiated. Prior to implementing any configuration changes, current wireless device settings are stored in memory, step 704. While current wireless device settings may be in wireless device memory 210, due to memory and power limitations in some wireless devices, it is also possible to upload the settings to memory 502 in server 120. If settings are uploaded, a connection to server 120 is established or verified prior to storing the settings in memory, step 703. Once saved, the configuration update is completed, step 706. If the configuration is unsuccessful or unwanted after, a restore operation may be initiated, step 710 as shown in flow chart 700B in FIG. 7B. Once initiated, the saved settings are downloaded to wireless device 102, step 712. Control processor 202 executes commands to returns wireless device to the saved settings, step 714.

Figure 8:
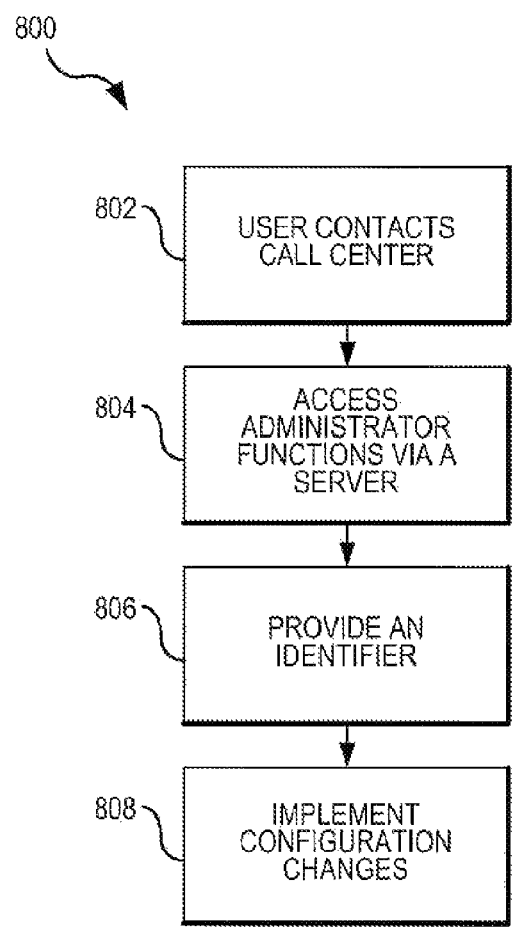
FIG. 8 is a flow chart diagram illustrating the operational steps for contacting a call center to configure a wireless device of an exemplary embodiment.

FIG. 8 is an illustrative flow chart 800 of general configuration steps for another exemplary embodiment. In this case, user 108 may contact call center 122 or other help provider to configure the wireless device step 802. A provider at call center 122 may access an administrator function on server 120, for example, step 804. Optionally, the user may provide an identifier to identify the wireless device to be configured, step 806. The identifies would not only identify the device, but also authenticate the user requesting the configuration change is authorized to make the requested change. Optionally, server 120 would transmit authentication information to wireless device 102 indicating server 120 and call center 122 are authorized to configure the wireless device. Configuration changes would next be implemented, step 808.

Figure 9:
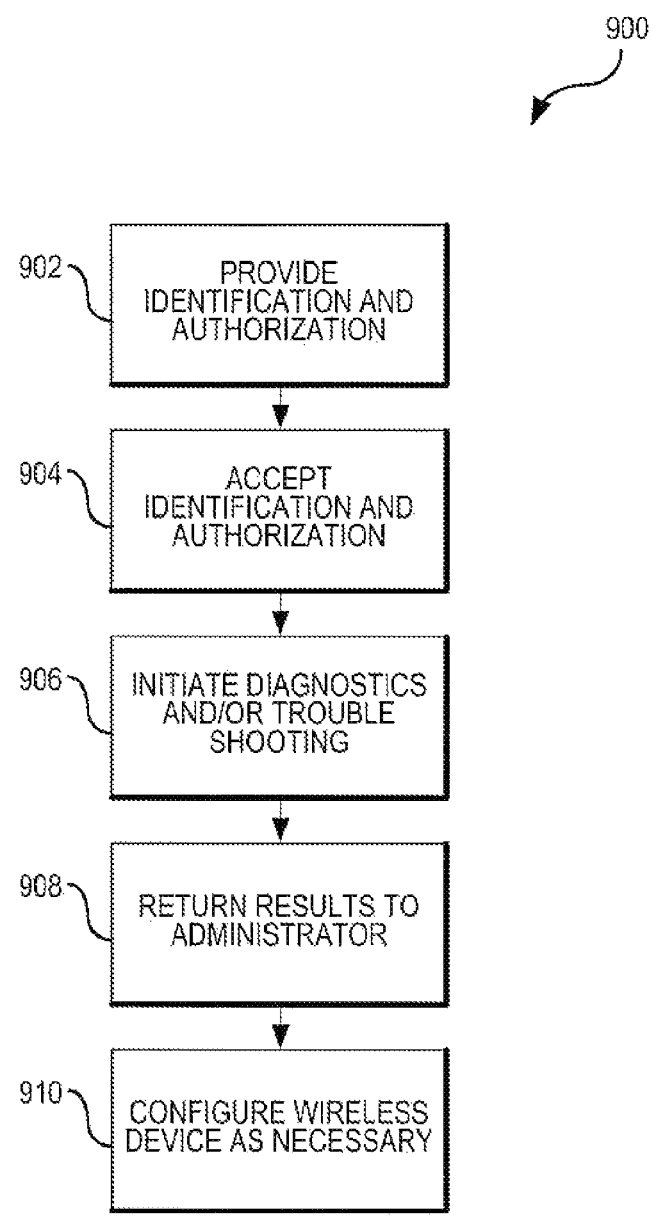
FIG. 9 is a flow chart diagram illustrating the operational steps for trouble shooting a wireless device from a remote administrator of an exemplary embodiment.

Remote administrator 110 (or server 120/call center 122) also may be used to perform diagnostic and trouble shooting on wireless device 102 as shown in an exemplary flow chart 900 in FIG. 9. First, remote administrator 110, server 120/call center 122 provides an authorization and identification signal to wireless device 102, step 902. The authorization and identification signal is accepted by wireless device 102 allowing access to diagnostic and trouble shooting tools, step 904. The diagnostics and trouble shooting tools are implements, step 906, and the results are returned to the remote station, step 908. Based on the returned results, the administrator (whether remote administrator 110 or server 120/call center 122) configures the wireless device based on the results to correct the situation, step 910.

Figure 10:
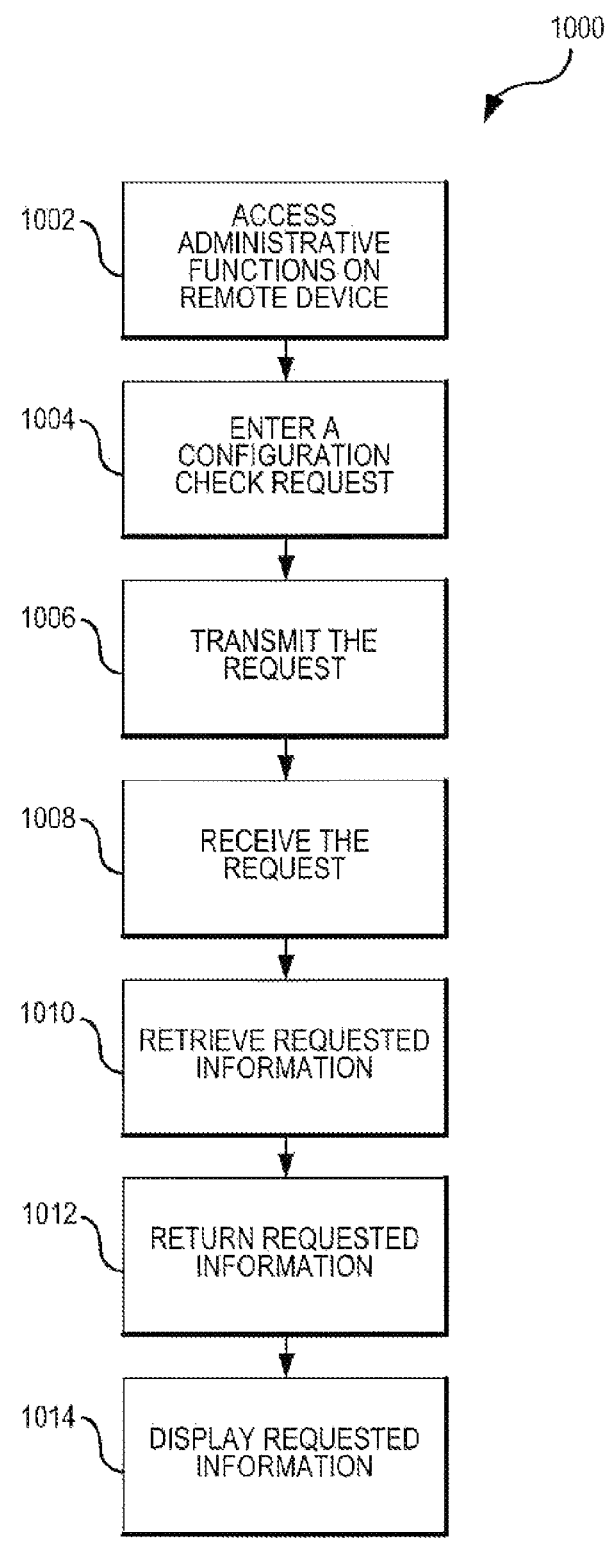
FIG. 10 is a flow chart diagram illustrating the operational steps for checking the configuration of a wireless device from a remote administrator of an exemplary embodiment.

In some cases, remote administrator 110 may desire to check the configuration of wireless device 102 in case user 108 purposefully or accidentally changed the configuration to a less desired setting. For example, if wireless device is used to provide an alarm for user 108 to take a medication or the like, if the alarm is accidentally turned off, a dangerous condition may exist. Thus, provider 112 may elect to use remote administrator 110 to check the configuration as shown in exemplary flow chart 1000 of FIG. 10. First, provider 112 accesses the administrate function on remote administrator 110, step 1002. Provider 112 next enters a configuration check in master software client 314, step 1004. Configuration check command could be one or more specific requests, such as, power configuration, volume configuration, alarm configuration, or a predetermined request, or a request of the all the controllable functions configurations. In any event, the query or poll is transmitted to wireless device 102 via network 106, step 1006. Controllable software client 214 receives the configuration check, step 1008. The controllable software client 214 retrieves the appropriate information from memory, such as memory 210, step 1010. The information is returned to remote administrator 110, step 1012. Remote administrator 110 then displays the information to provider 112, step 1014. If the configuration is not the desired configuration, provider 112 may elect to alert the configuration of the wireless device 102 as described above.

Figure 11:
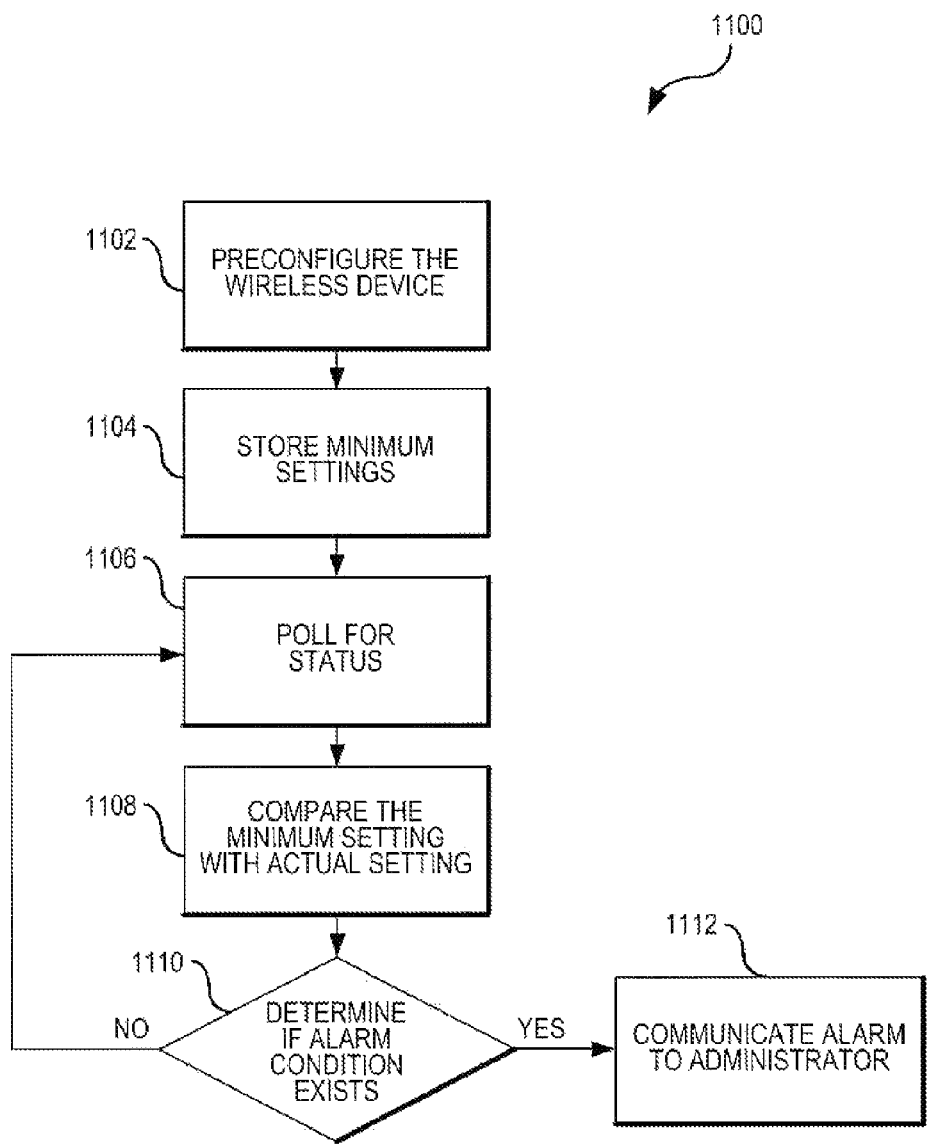
FIG. 11 is a flow chart diagram illustrating the operational steps for alerting a remote administrator of an alarm condition of an exemplary embodiment.

FIG. 11 shows an exemplary process whereby preset condition triggers or alarms can be loaded in wireless device. Such preset conditions may be stored in, for example, memory 210. Wireless device is pre-configured, step 1102. Pre-configured should be construed broadly to be a pre-alarm configuration whether an initial configuration or a modified configuration. Minimum settings are stored in a database associated with controllable software client 214, step 1104. For example, wireless device 102 may have a tracking feature such that the location of wireless device 102 can be identified at all time. In this case, the minimum setting is on. For other features, the configuration setting may be along a spectrum, such as, for example, ring volume must be above a particular setting or on vibrate. Controllable software client 214 polls control processor 202 for a status of the associated function, step 1106. Controllable software client 214 compares the polled status with a minimum setting, step 1108. Based on the comparison, controllable software client 214 determines whether an alarm condition exists, step 1110. For example, if the tracking feature was off, controllable software client 214 indicates an alarm setting. The alarm settings could be yes or no as shown or graduated. For the volume example, an alarm condition may exist if the setting is 3 out of a possible 10 (with 1 being a low volume and 10 being a high volume), but may provide a warning if the volume setting is between 3 and 6, for example. When the alarm condition is determined to exist, be it an actual alarm or a warning, the alarm is communicated to provider 112 using remote administrator 110, step 1112. Remote administrator could take appropriate actions, including alerting emergency personnel (if for example wireless device 102 is a heart monitor that indicates heart attack or the like, reconfiguring the device, or the like).

While not explicitly stated, each of the communications between wireless device 102 and remote administrator 110 and/or call center 120 may be encrypted using conventional encryption protocols. Moreover, remote administrator 110 and call center 120 may initiate a authentication and authorization protocol whenever communication between the remote administrator 110 and/or call center 120, and wireless device 102 occurs.

It is noted that the operational steps described in any of the exemplary embodiments herein are described to provide examples and discussion. The operations described may he performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for remotely configuring a wireless device of a user by a service provider, comprising:
    communicating a requested configuration from the wireless device to the service provider;
    accessing a remotely located administration device to initiate a configuration change based on the requested configuration;
    determining on the remotely located administration device whether the wireless device is powered on;
    transmitting a power-on signal to the wireless device from the remotely located administration device in response to determining on the remotely located administration device that the wireless device is not powered on, wherein the wireless device is capable of receiving the power-on signal while not powered on and the wireless device powers on in response to receiving the power-on signal; and
    while the wireless device is powered on, performing operations comprising:
        transmitting from the remotely located administration device to the wireless device commands to execute the configuration change;
        receiving at the wireless device the commands;
        confirming the received commands are from an authorized source;
        executing the commands at the wireless device to cause the configuration change to the requested configuration to occur, wherein the service provider remotely causes configuration changes in the wireless device of the user;
        transmitting from the wireless device to the remotely located administration device a confirmation of the configuration change;
        receiving on the wireless device feedback from the user, wherein the feedback comprises information indicating whether the configuration change is satisfactory or unsatisfactory to the user; and
        providing from the wireless device to the remotely located administration device the feedback received from the user.

2. The method of claim 1, wherein the requested configuration is provided in at least one of real-time or near real-time.

3. The method of claim 2, further comprising repeating the method for remotely configuring the wireless device of the user by the service provider based on the feedback.

4. The method of claim 1, wherein the requested configuration comprises at least one of enabling a feature, disabling a feature, or altering a feature.

5. The method of claim 1, further comprising reconfiguring a function of the wireless device based on the requested configuration, wherein the function is selected from a group of functions consisting of:
    downloading applications, downloading data, downloading patches, adjusting volume adjusting brightness, adjusting display fonts, adding to a contact list, deleting from the contact list, editing the contact list, assigning a speed dial, adjusting a volume, adjusting a ring style, initiating a communication, starting an application, and backing up wireless device memory and settings.

6. The method of claim 1, wherein communicating the requested configuration comprises communicating the requested configuration using at least one of a cellular telephone call, a data link, a USB connection, a network connection, an electronic mail, a text message, a two-way radio transmission, a conventional telephone call, and a VoIP telephone call.

7. The method of claim 1, wherein confirming the received commands are from an authorized source comprising authenticating an identity of the service provider.

8. The method of claim 7, wherein authenticating the identity of the service provider comprises receiving biometric information.

9. The method of claim 1, wherein confirming the received commands are from an authorized source comprises receiving an identification code from the remotely located administration device.

10. The method of claim 1, wherein the remotely located administration device is another wireless device.

11. The method of claim 10, wherein the remotely located administration device is identical to the wireless device.

12. The method of claim 1, wherein the service provider is a caregiver.

13. The method of claim 1, wherein the service provider is located at a call center.

14. The method of claim 1, wherein the remotely located administration device is a server connected to a network.

15. The method of claim 1, further comprising polling the wireless device by the remotely located administration device to determine a current configuration of the wireless device.

16. The method of claim 15, wherein transmitting from the remotely located administration device to the wireless device commands to execute the configuration change; receiving at the wireless device the commands; confirming the received commands are from an authorized source; and executing the commands at the wireless device to cause the requested configuration occur only if the current configuration of the wireless device is different than the requested configuration.

17. The method of claim 1, further comprising storing current configuration settings prior to executing the commands.

18. The method of claim 17, further comprising restoring the wireless device using the stored current configuration settings.

19. The method of claim 1, further comprising:
storing the commands in response to determining that the wireless device is powered off; and
implementing the commands on the wireless device when the wireless device is next powered.

20. The method of claim 1, further comprising displaying the commands to configure the wireless device.

21. The method of claim 20, wherein displaying the commands include displaying keystrokes on a display.

22. The method of claim 21, wherein displaying the commands comprises highlighting actual keys associated with the keystrokes.

23. The method of claim 20, further comprising providing at least one of audio, visual, or textual help along with the displayed commands.

24. A method for remotely trouble shooting a wireless device by a service provider, comprising:
communicating to the service provider a need for trouble shooting the wireless device;
accessing a remotely located administration device to initiate the trouble shooting;
receiving a power-up signal on the wireless device from the remotely located administration device, wherein the remotely located administration device transmits the power-up signal to the wireless device in response to determining that the wireless device is not powered on and wherein the wireless device is capable of receiving the power-on signal while not powered on;
powering on the wireless device in response to receiving the power-up signal; and
while the wireless device is powered on, performing operations comprising:
receiving from the remotely located administration device on the wireless device identification and authorization to trouble shoot;
initiating a trouble shooting procedure;
returning results to the remotely located administration device;
based on the returned results, configuring the wireless device;
transmitting from the wireless device to the remotely located administration device a confirmation of a configuration change;
receiving on the wireless device feedback from a user, wherein the feedback comprises information indicating whether the configuration change is satisfactory or unsatisfactory to the user; and
providing from the wireless device to the remotely located administration device the feedback received from the user.

25. The method of claim 24, wherein communicating to the service provider comprises establishing a communication path selected from one of a group of communication paths consisting of: a cellular telephone call, a data link, a USB connection, a network connection, an electronic mail, a text message, a two-way radio transmission, a conventional telephone call, and a VoIP telephone call.

26. A method for remotely checking a configuration of a wireless device by a remotely located administration device, comprising:
accessing administrative functions on the remotely located administration device;
determining whether the wireless device is powered on;
transmitting a power-on signal to the wireless device in response to determining that the wireless device is not powered on, wherein the wireless device is capable of receiving the power-on signal while not powered on and the wireless device powers on in response to receiving the power-on signal; and
while the wireless device is powered on, performing operations comprising:
entering a configuration check request to check the configuration of at least one part of the wireless device;
transmitting the request to the wireless device;
receiving an actual configuration of the wireless device;
displaying the actual configuration at the remotely located administration device;
transmitting an initiation request to the wireless device to initiate a configuration change based on the displayed actual configuration;
receiving from the wireless device a confirmation of the configuration change; and
receiving feedback from the wireless device, wherein the feedback comprises information obtained on the wireless device from a user regarding whether the configuration change is satisfactory or unsatisfactory to the user.

27. The method of claim 26, further comprising storing the actual configuration of the wireless device prior to transmitting the initiation request.

28. The method of claim 27, further comprising restoring the actual configuration.

29. The method of claim 26, comprising establishing a data link with the wireless device.

30. The method of claim 29, wherein the data link comprises a data link selected from a group of data links consisting of:
a cellular telephone call, a USB connection, a network connection, an electronic mail, a text message, a two-way radio transmission, a conventional telephone call, and a VoIP telephone call.

31. A method of alerting a remotely located administration device that an alarm condition exists on a pre-configured wireless device, comprising:
storing minimum configuration settings in a memory associated with the pre-configured wireless device;
polling actual configuration settings of the pre-configured wireless device;
comparing the actual configuration settings to the stored minimum configuration settings;
determining based on the comparison whether an alarm condition exists;
transmitting the alarm condition to a service provider when it is determined that the alarm condition exists;
receiving a power-up signal on the pre-configured wireless device from the remotely located administration device, wherein the remotely located administration device transmits the power-up signal to the pre-configured wireless device in response to determining that the pre-configured wireless device is not powered on and wherein the pre-configured wireless device is capable of receiving the power-on signal while not powered on;
powering on the pre-configured wireless device in response to receiving the power-up signal; and
while the pre-configured wireless device is powered on, performing operations comprising:
receiving a configuration change from the remotely located administration device, wherein the configuration change is initiated at the remotely located administration device by the service provider based on the alarm condition received by the service provider;

transmitting from the pre-configured wireless device to the remotely located administration device a confirmation of the configuration change;

receiving on the pre-configured wireless device feedback from a user, wherein the feedback comprises information indicating whether the configuration change is satisfactory or unsatisfactory to the user; and providing from the pre-configured wireless device to the remotely located administration device the feedback received from the user.

32. The method of claim 31, further comprising authenticating the configuration change is from an authorized remotely located administration device.

33. A wireless system to allow a remotely located administration device to configure a wireless device, comprising:

a communication network;

a base station interconnected to the communication network;

a wireless device comprising a controllable software client and wirelessly interconnected to the base station; and a remotely located administration device interconnected to the communication network and comprising a master software client, wherein:

the wireless device is configured to communicate a request for a configuration change to the remotely located administration device;

the remotely located administration device is configured to:

determine whether the wireless device is powered on;

transmit a power-on signal to the wireless device in response to determining that the wireless device is not powered on, wherein the wireless device is capable of receiving the power-on signal while not powered on and the wireless device powers on in response to receiving the power-on signal; and while the wireless device is powered on, transmit command functions from the master software client to the controllable software client, wherein the command functions are based on the request; and the controllable software client is configured to perform operations while the wireless device is powered on, the operations comprising:

executing the command functions to configure the wireless device;

transmitting to the remotely located administration device a confirmation of the configuration change;

receiving feedback from a user, wherein the feedback comprises information indicating whether the configuration change is satisfactory or unsatisfactory to the user; and providing to the remotely located administration device the feedback received from the user.

34. The wireless system of claim 33, wherein the command functions to configure the wireless device are executed in real-time or near real-time.

35. The wireless system of claim 33, wherein the remotely located administration device is wirelessly interconnected to another base station and the another base station is interconnected to the communication network.

36. The wireless system of claim 33, wherein the communication network comprises a plurality of networks.

37. The wireless system of claim 33, wherein the communication network is selected from a group of communication networks comprising: cellular telephone networks, public switch telephone networks, LAN, WAN, WiFi, wireless networks, WiMax, Bluetooth, IEEE 801.11, Internet, and Ethernet.

38. The wireless system of claim 33, further comprising a call center interconnected to the wireless device and wherein the remotely located administration device is a server.

39. The wireless system of claim 33, wherein the remotely located administration device is identical to the wireless device.

40. The wireless system of claim 33, wherein the wireless device is selected from a group of wireless devices comprising: cellular telephones, pagers, PDAs, digital music players, video players, hand held computers, and laptop computers.

41. A wireless device adapted to be configured remotely by a service provider with a remotely located administration device, the wireless device comprising:

a transmit/receive circuit configured to transmit/receive signals to/from a wireless communications network;

a user interface; and a control processor configured with a controllable software client, wherein the controllable software client is configured to perform operations comprising:

receiving a power-up signal from the remotely located administration device, wherein the remotely located administration device transmits the power-up signal to the wireless device in response to determining that the wireless device is not powered on and wherein the wireless device is capable of receiving the power-on signal while not powered on;

powering on the wireless device in response to receiving the power-up signal; and while the wireless device is powered on, performing operations comprising:

receiving configuration commands over the wireless communications network from a master software client;

causing the control processor to configure the wireless device based on the configuration commands;

transmitting to the remotely located administration device a confirmation of a configuration change caused by the control processor;

receiving feedback from a user, wherein the feedback comprises information indicating whether the configuration change is satisfactory or unsatisfactory to the user; and providing to the remotely located administration device the feedback received from the user.

42. The wireless device of claim 41, comprising a memory associated with the control processor, wherein the memory is configured to store current configuration settings.

43. The wireless device of claim 42, wherein the controllable software client is responsive to queries from the remotely located administration device to retrieve the current configuration settings from the memory and transmit the current configuration settings over the wireless communications network to the remotely located administration device.

44. The wireless device of claim 41, further comprising a memory associated with the wireless device, wherein the controllable software client is configured to perform operations further comprising:

storing minimum configuration settings in the memory;

polling the wireless device to determine whether actual configuration settings are different than the minimum configuration settings; and transmitting to a remotely located administration device when an alarm condition exists based on the determination.

45. A remotely located administration device adapted to remotely configure a wireless device, the remotely located administration device comprising:
- a transmit/receive circuit configured to transmit/receive signals to/from a wireless communications network;
- a user interface; and
- a control processor, wherein the control processor comprises a master software client that transmits configuration commands over the communications network to a controllable software client operating on the wireless device,
- wherein the controllable software client is configured to perform operations while the wireless device is powered on, the operations comprising:
  - causing a processor operating on the wireless device to configure the wireless device based on the configuration commands;
  - transmitting to the remotely located administration device a confirmation of a configuration change;
  - receiving feedback from a user, wherein the feedback comprises information regarding whether the configuration change is satisfactory or unsatisfactory to the user; and
  - providing to the remotely located administration device the feedback received from the user, and
- wherein the master software client is configured to perform operation comprising:
  - determining whether the wireless device is powered on;
  - transmitting a power-on signal to the wireless device in response to determining that the wireless device is not powered on, wherein the wireless device is capable of receiving the power-on signal while not powered on and the wireless device powers on in response to receiving the power-on signal; and
  - receiving the feedback from the wireless device.

46. The remotely located administration device of claim 45, wherein the remotely located administration device is a wireless device interconnected to the wireless communications network.

47. The remotely located administration device of claim 45, wherein the remotely located administration device is a server connected a network.

48. A method for a remotely located administration device to configure a wireless device, comprising:
- receiving a communication from a third entity to initiate a configuration change for the wireless device;
- determining whether the wireless device is powered on;
- transmitting a power-on signal to the wireless device in response to determining that the wireless device is not powered on, wherein the wireless device is capable of receiving the power-on signal while not powered on and the wireless device powers on in response to receiving the power-on signal; and
- while the wireless device is powered on, performing operations comprising:
  - sending an identification signal to a controllable software client on the wireless device;
  - receiving a communication from the controllable software client;
  - sending a command to the controllable software client to reconfigure the wireless device in accordance with the communication from the third entity in response to determining that the communication from the controllable software client provides authorization;
  - receiving feedback from the controllable software client regarding any configuration changes made to the wireless device in response to the command, wherein the feedback comprises information indicating whether a configuration change is satisfactory or unsatisfactory to the user; and
  - notifying the third entity of the feedback from the controllable software client.

* * * * *